United States Patent [19]

Wong

[11] 4,396,796
[45] Aug. 2, 1983

[54] ENCAPSULATED ELECTRONIC DEVICES AND ENCAPSULATING COMPOSITIONS

[75] Inventor: Ching-Ping Wong, Lawrence Township, Mercer County, N.J.

[73] Assignee: Western Electric Company, Inc., New York, N.Y.

[21] Appl. No.: 202,286

[22] Filed: Oct. 30, 1980

[51] Int. Cl.³ .......................... C08K 5/06; C08K 5/35; H02G 13/08

[52] U.S. Cl. ................................ 174/52 PE; 524/92; 524/95; 524/107; 524/108; 428/542

[58] Field of Search .................... 260/338; 525/6, 474; 524/92, 95, 107, 108; 174/52 PE

[56] References Cited

U.S. PATENT DOCUMENTS

| | | | |
|---|---|---|---|
| 2,555,169 | 5/1951 | Voorthuis | 525/121 |
| 3,025,269 | 3/1962 | Calfee | 525/332 |
| 3,247,155 | 4/1966 | Frank et al. | 260/30.4 |
| 4,107,180 | 8/1978 | Dye et al. | 260/338 |
| 4,116,887 | 9/1978 | Lehn et al. | 528/20 |
| 4,117,029 | 9/1978 | Katano | 260/45.7 S |

OTHER PUBLICATIONS

Chem. Abst. Kaneda et al., Mar. 1976, 85:39929Q.

*Primary Examiner*—Wilbert J. Briggs, Sr.
*Attorney, Agent, or Firm*—J. F. Spivak

[57] ABSTRACT

An electronic device such as an integrated circuit is encapsulated within a silicone resin formulation having a protonated heterocyclic compound contained therein. The compound complexes with free anionic contaminants to form a non-migratory, non-corrosive protonated heterocyclic compound-anion complex, thereby preventing anionic attack of metallic circuit elements.

36 Claims, No Drawings

ENCAPSULATED ELECTRONIC DEVICES AND ENCAPSULATING COMPOSITIONS

TECHNICAL FIELD

This invention relates to electronic devices such as semiconductor devices and integrated circuits having silicone encapsulants, and particularly, to electronic devices wherein the silicone encapsulant includes additives to prevent anion migration.

BACKGROUND OF THE INVENTION

Electronic devices, particularly integrated circuits and semiconductors, are usually coated or encapsulated with a polymeric silicone resin, such as a room temperature vulcanized (RTV) silicone elastomer, to protect the device from mechanical damage and from adverse environmental effects of temperature and humidity.

In the process of making the encapsulant, trace amounts of unwanted anions, particularly chloride ions, and HCl are generally introduced. For example, HCl is a by-product in the preparation of several of the materials used to make the encapsulant, in particular the base polymer, crosslinker, and catalyst. The acid is not adequately removed from these and is, therefore, subsequently introduced into the encapsulant. Chloride ions are introduced by the dissociation of NaCl, hydrolysis of HCl, and as a residue of solder flux. The presence of these contaminants leads to device malfunctioning and failure. HCl and chloride ions, in particular, cause corrosion of the metallic components of the electronic device, dendrite formation, and eventually short circuiting due to the formation of metallic dendritic bridges between the cathode and anode of the device.

Attempts to further reduce the concentration of contaminants present in encapsulating compositions by modifying the method of preparation have proven unsuccessful. Another approach has been to sequester the contaminants so that they are not later free to migrate under the conditions of high bias, temperature and moisture that typify the operating environment of many electronic devices. For example, Kaneda reported in Chem. Abstracts (March, 1976, p. 39929q, Japanese Pat. No. 76-11377), under the title "Semiconductor Sealing Resin Composition Containing Crown Ethers or Cryptate Ethers as the Alkali Metal Ion Getters," that the addition of crown ethers or cryptate ethers resulted in better operational stability of resin-molded semiconductor devices by forming stable complexes with alkali metal ion contaminants. However, the formulation Kaneda discloses is limited to the sequestering of cations.

Accordingly, it is an object of this invention to provide a method of preventing migration of anions on an electronic device by immobilizing the anions.

SUMMARY OF THE INVENTION

The migration of anions on an electronic device is prevented by adding a protonated heterocyclic compound to the electronic device. The contaminant anions are immobilized by their forming a stable and non-migrating complex with the protonated compound, thereby, significantly decreasing the occurrence of migrative short circuits and, consequently, device failure. The protonated heterocyclic compound is generally added to the device as part of an encapsulating composition used to encapsulate the device.

The invention also includes the resulting article of manufacture.

Furthermore, the invention lies in an encapsulant having a protonated heterocyclic compound contained therein.

DETAILED DESCRIPTION

Electronic devices are usually coated with a polymeric elastomer to protect the device from adverse environmental effects. However, the encapsulant, such as a polymeric silicone, itself carries contaminants that are detrimental to device functioning. The presence of anionic contaminants such as halogen ions, in particular chloride ions, leads to corrosion of the metallic anode. It is believed that chloride ions react with the metallic anode with the consequent formation of a metallic chloride complex ion that behaves as an electrolyte and migrates under high bias. It is further believed that under the operating conditions of high bias, humidity and temperature, the metallic chloride ion disassociates and metal is deposited and metallic dendrites form. The chloride may then be released as a gas or recycled as HCl to start the cycle over. When the dendritic connection between cathode and anode is continuous, a migrative short circuit has been established that results in device malfunctioning and possibly device failure.

The present invention prevents such device failure by immobilizing anions, in particular, chloride ions, by the addition of large protonated heterocyclic compounds to the device. The anion forms a stable protonated heterocyclic compound-anion complex and is no longer available for reaction with the metallic anode. While the heterocyclic compound may be applied to the device prior to encapsulation, preferably it is added as part of the encapsulant composition. The protonated heterocyclic compounds can contain carbon plus nitrogen, oxygen or sulfur and/or any combination of these. Also, the protonated heterocyclic compounds can be used in any combination or singularly.

The stability of the protonated heterocyclic compound-anion complex depends on several factors. The anion becomes bound to the active protonated site of the compound and only those protonated heterocyclic compounds having sufficient charge to bind the anion are suitable. In selecting the appropriate compound, therefore, the number and position of the active sites must be considered. In addition, the dimension of the compound relative to the anion to be complexed is important. Only those cyclic compounds having the right dimension as well as charge are used. Very small molecules that cannot accommodate the anion are not preferred, and similarly, compounds having very large dimension, such that any bonds which may be formed for complexing the anion would be inherently weak are also not preferred. Finally, compounds that are relatively nontoxic are preferred.

Heterocyclic compounds well suited, when protonated, to entrap anions, particularly chloride ions, include protonated cryptate ethers, crown ethers, cycloamines and any combination of these. The unprotonated compounds are known to the art and no novelty is claimed for them per se. They can be protonated by the addition of any strong organic acid such as fluoroboric acid, trifluroacetic acid, formic acid and oxalic acid. Inorganic acids, such as sulfuric acid, could be used but they usually have adverse effects on the device and so are not preferred. One should not employ an acid having an anion which would be corrosive to the device.

In the preferred embodiment of this invention, at least stoichiometric amounts of a protonated bicyclic cryptate ether is added to an RTV silicone elastomer encapsulant and is used to encapsulate an electronic device. Said encapsulant preferably includes in addition to the protonated heterocyclic compound, a hydroxy terminated polydimethoxysiloxane, a crosslinking agent, a titanate catalyst, and a stablizer.

Examples of suitable crosslinking agents are trimethoxymethylsilane, triethoxymethylsilane, and vinylsilane. Examples of suitable catalysts are tetra-n-butyltitanate, tetra-isopropyl-titanate, tetraethyltitanate and tetraisobutyl-titanate. Examples of suitable stabilizers are metal $\beta$-diketones such as nickel acetylacetonate and chromium acetylacetonate.

The term stoichiometric as applied to the amount of protonated heterocyclic compound to be added to the elastomer refers to that minimum amount of compound required to bind all of the chloride or other contaminating anions present in the elastomer. It is assumed for these purposes that one mole of anion is bound by one mole of protonated heterocyclic compound; however, it is probable that indeed more than one molecule of anion is bound to any particular protonated heterocyclic compound.

Cryptate ethers for use in sequestering anions are available from Merck, West Germany and are sold under the tradename Kryptofix. Any one or a combination of these compounds can be used after being protonated by the addition of acid. Examples of suitable cryptate ethers that are protonated before use are 4,7,13,16-tetraoxa-1,10-diazacyclooctadecane (Kryptofix® 22); 1,10-didecyl-4,7,13,16-tetraoxa-1,10-diazacyclooctadecane (Kryptofix® 22DD); 4,7,13,16,21-pentaoxa-1,10-diazabicyclo (8,8,5) tricosane (Kryptofix® 221); and 4,7,13,16,21,24 hexaoxa-1,10-diazabicyclo (8,8,8) hexacosane (Kryptofix® 222). However, it is possible to use any protonated cryptate ether represented by the formula:

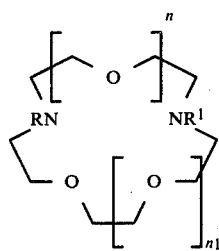

wherein n is an integer from 1 to 3, $n_1$ is an integer from zero to 3, R and $R^1$ can be hydrogen or any organic radical such as alkyl chains, that will not interfere with the complexing of the anion with the compound.

The preferred cryptate ethers are bicyclic compounds represented by the formula:

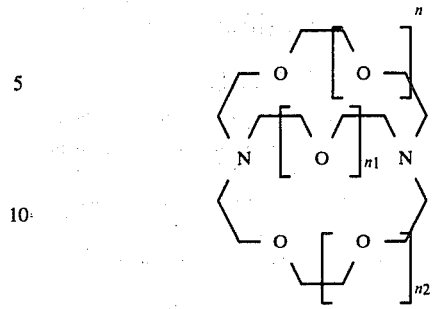

wherein n can be an integer from zero to 3, $n_1$ can be an integer from 1 to 3, $n_2$ can be an integer from zero to 3, and any derivative thereof. A tricyclic form of the compound can also be used.

Crown ethers, also known as macrocyclic polyethers are commercially available and when protonated prior to inclusion in the encapsulant composition are suitable in the practice of this invention. Suggested protonated crown ethers for complexing anions, particularly those of the size of chloride ions, include crown ethers, and derivatives thereof, having a ring size of from 12 to 24 members including from 4 to 8 oxygen atoms therein. More particularly, 24-crown-8, 21-crown-7, 18-crown-6, 15-crown-5 and 12-crown-4 ethers are suitable. The numeral antecedent to the crown term defines the number of atoms in the cyclic structure and the numeral subsequent to the crown term indicates the number of oxygen or ethers within that cyclic structure.

It should be understood that the term ether as used herein includes thioethers, where some or all of the normal oxygen ether bonds are substituted by sulfur.

Protonated cycloamines having a 12 to 18 member ring and including from 3 to 6 nitrogen atoms and derivatives thereof are also suitable in the practice of this invention.

Should it be desirable to sequester any anions other than chloride ions, then protonated compounds of larger or smaller dimension should be used accordingly.

It is preferrable to add at least stoichiometric amounts of the protonated heterocyclic compound to the encapsulant so that all the free anions will be complexed. The absolute amount of compound to add is determined by performing ordinary potentiometric titration or electron capture techniques on each of the component parts used to make the final elastomer encapsulant. Generally the encapsulating material used in our examples, i.e., RTV silicone elastomer, contains about 100 ppm chloride ions per 10 g of elastomer.

The effectiveness of ion trapping by each of the preferred protonated heterocyclic compounds within a silicone elastomer encapsulant was determined by silver nitrate precipitation testing. The heterocyclic compound was dissolved in a suitable solvent such as ethanol, then acidified with a suitable organic acid such as trifluoroacetic acid and stirred. Dilute hydrochloric acid was then added, followed by the addition of silver nitrate. If no silver chloride precipitate was observed, it was presumed that the chloride ion was sequestered by the protonated heterocyclic compound and consequently the particular compound was suitable for use in the present invention.

The results of these tests indicate that protonated cryptate ethers are better at sequestering chloride ions then protonated crown ethers or cycloamines and that the efficiency of sequestering of each of these varies with the dimension and charge of the particular compound. For example, Kryptofix ®22 (4,7,13,16-tetraoxa-1,10-diazacyclooctadecane), a smaller molecule, is less efficient at sequestering chloride ions than Kryptofix ® 221 (4,7,13,16,21-pentaoxa-1,10-diazabicyclo (8,8,5) tricosane) a larger molecule.

The overall results of many of these tests were used to determine the range of molecules suitable to practice this invention.

The following specific examples exemplify the present invention.

EXAMPLE I

The amount of chloride ions present in the encapsulating RTV silicone elastomer is determined by potentiometer titration analysis of each of the component materials making up the final encapsulant. In this instance 100 ppm chloride ions ($2.28 \times 10^{-5}$ M) are present. Therefore, 36 mg of the cryptate ether Kryptofix ® 221 (4,7,13,16,21-pentaoxa-1,10-diazabicyclo-(8,8,5)-tricosane), having the structure

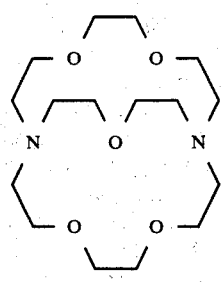

is added to 5 ml of xylene. This amount represents a 3.7 times excess of the stoichiometric amount calculated to entrap all the free chloride ions, assuming a 1 to 1 binding ratio. The cryptate ether is then protonated by the addition of 2 parts trifluoroacetic acid (24.6 mg). The mixture is stirred overnight and vacuum dried to one-half the original volume to remove excess solvent and acid. The protonated cryptate ether is then added to hydroxy-terminated polydimethylsiloxane (silicone) dissolved in Xylene (10 g/10 ml) and stirred overnight to facilitate the complexing of the free chloride ions to the protonated heterocyclic compound. A crosslinker, trimethoxymethylsilane (1.5 g) is added, stirred 15 minutes and then a titanium catalyst, tetra-alkoxytitanate, which has been treated with methanol is added (0.075 g). After 16 hours at room temperature, a transition metal diacetylacetonate (0.2%) is added as a thermal stabilizer and the mixture stirred. The resulting formulation is poured onto the device, cured at room temperature for 11 hours and then at 120° C. for four additional hours so that a homogeneous RTV elastomer is formed.

EXAMPLE II

The procedure as described in Example I is followed except using 10 mg of the cycloamine 1,4,8,11-tetramethyl-1,4,8,11-tetraazacyclotetradecane having the formula:

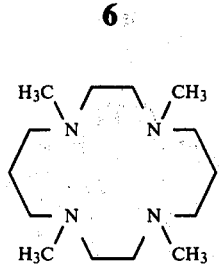

and protonated with 0.2 ml of 1 M trifluoroacetic acid.

EXAMPLE III

The procedure as described in Example I is followed except using 10 mg of 15 crown 5 ether having the formula:

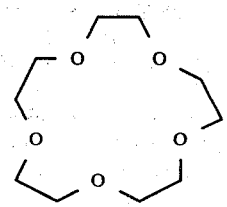

and protonated with 0.2 ml of 1 M trifluoroacetic acid.

What is claimed is:

1. A method of immobilizing free anions on an electronic device which comprises applying to the device a room temperature vulcanizable silicone elastomer containing therein a protonated heterocyclic compound having a charge and dimension to firmly bind said free anions.

2. The method as recited in claim 1 wherein the free anions include a halogen.

3. The method as recited in claim 2 wherein the halogen is a chloride ion.

4. The method as recited in claim 1 wherein the protonated heterocyclic compound is selected from the group consisting of protonated cryptate ethers, crown ethers and cycloamines.

5. The method as recited in claim 4 wherein the protonated heterocyclic compound is a protonated cryptate ether and wherein the cryptate ether has the structural formula:

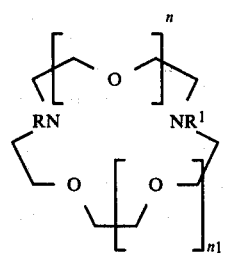

wherein n is an integer from 1 to 3, $n_1$ is an integer from zero to 3 and R and $R_1$ are selected from hydrogen and an organic radical.

6. The method as recited in claim 4 wherein the protonated heterocyclic compound is a protonated cryptate ether and wherein the cryptate ether has the structural formula:

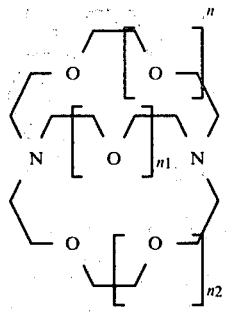

wherein n is an integer from zero to 3, $n_1$ is an integer from 1 to 3, $n_2$ is an integer from zero to 3 and any derivative thereof.

7. The method as recited in claim 4 wherein the protonated heterocyclic compound is a protonated crown ether having a 12 to 24 member ring with 4 to 8 oxygen atoms therein.

8. The method as recited in claim 4 wherein the protonated heterocyclic compound is a cycloamine having a 12 to 18 member ring with 3 to 6 nitrogen atoms therein.

9. The method as recited in claim 1 wherein the heterocyclic compound is protonated by the addition of an organic acid.

10. The method as recited in claim 1 wherein the protonated heterocyclic compound is added to the encapsulant in at least a stoichiometric molar quantity as determined by the number of moles of anionic impurity in the encapsulant.

11. An article of manufacture comprising an electronic device having a room temperature vulcanizable silicone elastomer encapsulant thereover, said encapsulant comprising a protonated heterocyclic compound thereon having a charge and dimension to firmly bind anionic contaminants.

12. The article of manufacture as recited in claim 11 wherein the protonated heterocyclic compound is selected from the group consisting of protonated cryptate ethers, crown ethers and cycloamines.

13. The article of manufacture as recited in claim 12 wherein the protonated heterocyclic compound is a protonated cryptate ether and wherein the cryptate ether has the structural formula:

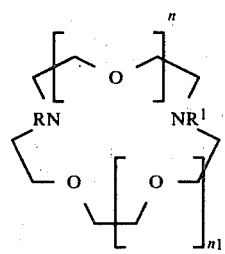

wherein n is an integer from 1 to 3, $n_1$ is an integer from zero to 3 and R and $R_1$ can be hydrogen and an organic radical.

14. The article of manufacture as recited in claim 12 wherein the protonated heterocyclic compound is a protonated cryptate ether and wherein the cryptate ether has the structural formula:

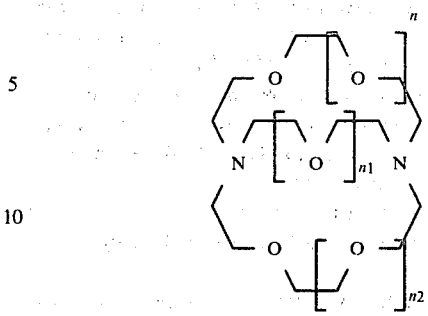

wherein n is an integer from zero to 3, $n_1$ is an integer from 1 to 3, $n_2$ is an integer from zero to 3 and any derivative thereof.

15. The article of manufacture as recited in claim 12 wherein the protonated heterocyclic compound is a protonated crown ether having a 12 to 24 member ring with 4 to 8 oxygen atoms therein.

16. The article of manufacture as recited in claim 12 wherein the protonated heterocyclic compound is a protonated cycloamine having a 12 to 18 member ring with 3 to 6 nitrogen atoms therein.

17. The article of manufacture as recited in claim 11 wherein the heterocyclic compound is protonated by the addition of an organic acid.

18. The article of manufacture as recited in claim 11 wherein the protonated heterocyclic compound is present in the encapsulant in at least a stoichiometric molar quantity as determined by the number of moles of anionic impurity in the encapsulant.

19. A composition of matter comprising a room temperature vulcanizable silicone elastomer having dissolved therein a protonated heterocyclic compound having a charge and dimension sufficient to firmly bind anionic contaminants.

20. A composition of matter as recited in claim 19 wherein the protonated heterocyclic compound is selected from the group consisting of protonated crown ether, cryptate ether and cycloamines.

21. The composition of matter as recited in claim 20 wherein the protonated heterocyclic compound is a protonated cryptate ether and wherein the cryptate ether has the structural formula:

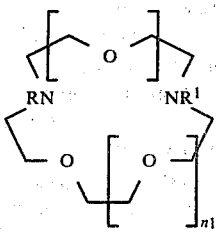

wherein n is an integer from 1 to 3 and $n_1$ is an integer from zero to 3 and R and $R_1$ are selected from hydrogen and an organic radical.

22. The composition of matter as recited in claim 20 wherein the protonated heterocyclic compound is a protonated cryptate ether and wherein the cryptate ether has the structural formula:

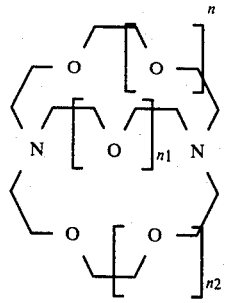

wherein n is an integer from zero to 3, $n_1$ is an integer from 1 to 3, $n_2$ is an integer from zero to 3 and any derivative thereof.

23. The composition of matter as recited in claim 20 wherein the protonated heterocyclic compound is a protonated crown ether having a 12 to 24 member ring with 4 to 8 oxygen atoms therein.

24. The composition of matter as recited in claim 20 wherein the protonated heterocyclic compound is a protonated cycloamine having a 12 to 18 member ring with 3 to 6 nitrogen atoms therein.

25. The composition of matter as recited in claim 19 wherein the heterocyclic compound is protonated by the addition of an organic acid.

26. The composition of matter as recited in claim 19 wherein the protonated heterocyclic compound is added to the elastomer in at least a stoichiometric molar quantity as determined by the number of moles of anionic impurity in the encapsulant.

27. A method of immobilizing free anions on an electronic device which comprises applying to the device a protonated heterocyclic compound having a charge and dimension sufficient to firmly bind said free anions and an encapsulate for said device.

28. The method as recited in claim 27, wherein the free anions include a halogen.

29. The method as recited in claim 27, wherein the protonated heterocyclic compound is selected from the group consisting of protonated cryptate ethers, crown ethers and cycloamines.

30. The method as recited in claim 27, wherein the heterocyclic compound is protonated by the addition of an organic acid.

31. The method as recited in claim 27, wherein the protonated heterocyclic compound is added to the encapsulate in at least a stoichiometric molar quantity as determined by the number of moles of anionic impurity in the encapsulate.

32. An article of manufacture comprising an electronic device having a polymeric encapsulate thereover, said encapsulate comprising a protonated heterocyclic compound having a charge and dimension so as to firmly bind anionic impurities.

33. The article of manufacture as recited in claim 32, wherein the protonated heterocyclic compound is selected from the group consisting of protonated cryptate ethers, crown ethers and cycloamines.

34. The article of manufacture as recited in claim 32, wherein the heterocyclic compound is protonated by the addition of an organic acid.

35. The article of manufacture as recited in claim 32, wherein the protonated heterocyclic compound is present in the encapsulate in at least a stoichiometric molar quantity as determined by the number of moles of anionic impurity in the encapsulate.

36. A composition of matter comprising a polymeric encapsulant having dissolved therein a protonated heterocyclic compound having a charge and dimension sufficient to entrap anionic contaminants.

* * * * *